Patented Oct. 24, 1933

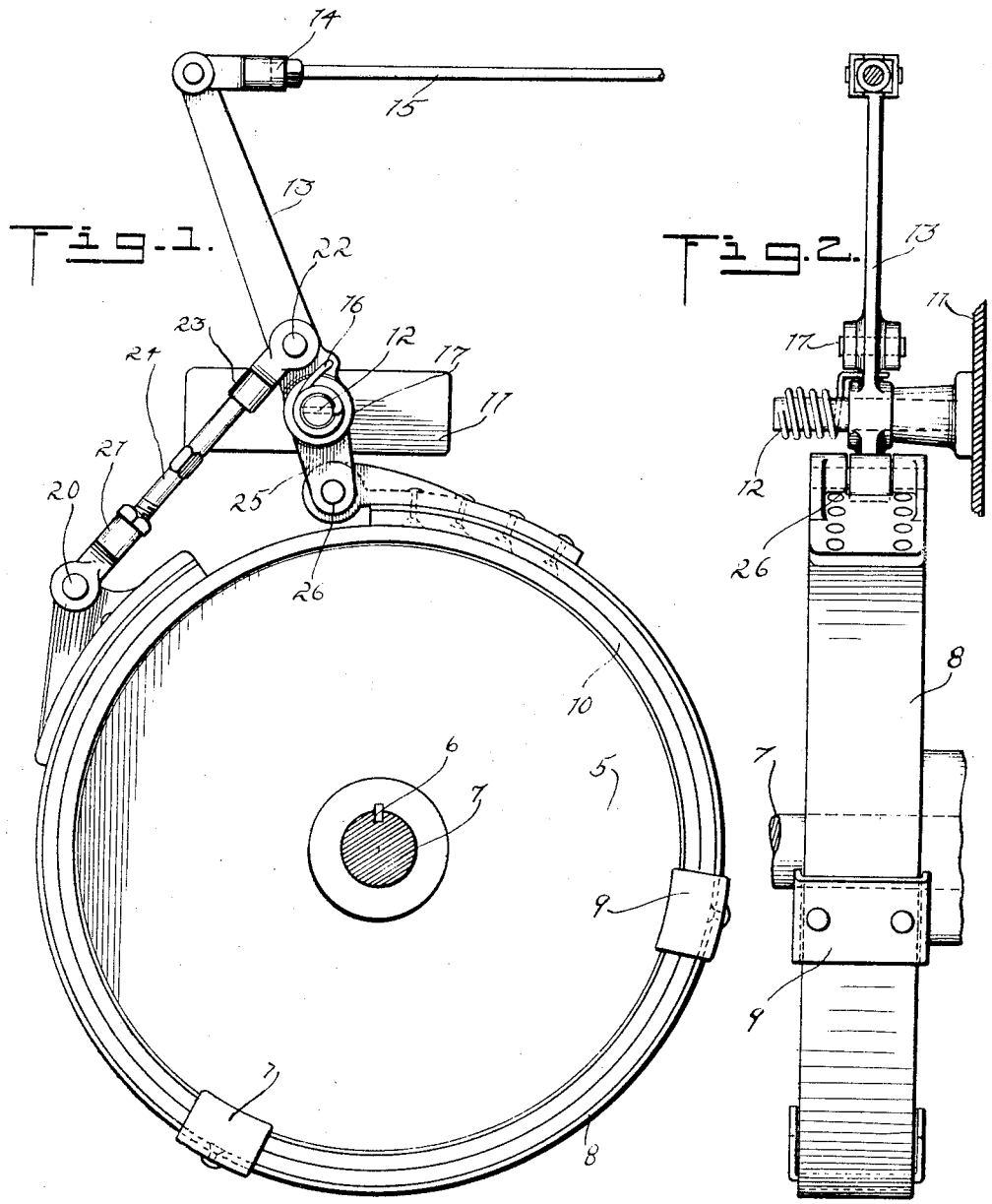

1,932,299

UNITED STATES PATENT OFFICE 1,932,299

BRAKE MECHANISM

Ulrich Wippermann, New York, N. Y.

Application April 9, 1931. Serial No. 528,880

1 Claim. (Cl. 188—77)

The present invention relates to new and useful improvements in brake mechanisms, and more particularly it pertains to a new and novel brake mechanism wherein a maximum braking effect can be obtained with a minimum effort.

It is a further object of the invention so to construct a braking mechanism that a friction band may be caused to uniformly grip a brake drum throughout the length of the friction band in a uniform manner.

With the above and other objects in view which will appear as the nature of the invention is better understood, reference is had to the accompanying drawing, wherein;

Figure 1 is a view in elevation partly in section of a braking mechanism constructed in accordance with the present invention; and, Figure 2 is a view in elevation taken at right angles to Figure 1.

Referring particularly to the drawing, the reference numeral 5 designates a brake drum which is keyed as at 6 to an axle, shaft or the like 7 in such a manner as to rotate therewith.

The reference numeral 8 designates a friction band which surrounds the drum 5 and is maintained against accidental displacement relative thereto by means of suitable clips or the like 9 the side flanges of which extend downwardly around the flange 10 of the brake drum 5.

The reference character 11 designates any stationary point such as the side frame of a motor vehicle chassis, and projecting from this stationary member 11, there is a stub shaft or the like, 12. Pivotally mounted upon the stub shaft 12 there is an operating lever 13 to the upper end of which is connected as at 14, a suitable pull rod 15 by means of which the lever 13 may be rocked about the stub shaft 12. A spring of the axial type surrounds the stub shaft 12, and has one end connected to the operating lever 13 as at 16, the opposite end of the spring being connected to the stub shaft 12 by passing the same through an opening therein. This spring which is designated 17 in the drawing, tends to rock the upper end of the lever 13 to the left in Figure 1 to move the friction band 8 to its extended position and release its gripping action upon the flange of the brake drum 5. The pull rod 15 in its action upon the lever 13 is adapted to operate the same against the tension of the spring 17.

One end of the friction band has pivotally mounted thereon as at 20, a socket member 21 and pivotally mounted upon the lever 13 as at 22 there is a similar member 23 and these members are connected by a threaded shank 24. This construction provides in effect a turn buckle by means of which an adjustment of the friction band 8 may be had. It will be noted that the pivot 22 is in direct line with the pivot of the lever 13 and the longitudinal axis of the lever as designated by the line A—A in Figure 1. The lower end of the lever designated 25 is offset and the friction band 8 is pivotally connected to this offset lower end as at 26 which pivotal point is out of alinement with the pivotal point of the lever 13 and the pivotal point 22 heretofore mentioned.

By this last mentioned construction, greater leverage of the lever 13 is obtained and a consequent maximum braking power with minimum effort is obtained.

While the invention has been herein illustrated in its preferred form, it is to be understood that the invention is not limited to the specific construction herein shown, but may be practiced in other forms without departing from the spirit thereof.

Having thus described the invention, what is claimed as new and what it is desired to secure by Letters-Patent of the United States, is:

In combination, a brake drum, a brake band surrounding the drum, substantially channel-shaped clips connected with the band and having their flanges engaging portions of the drum, said band being of one piece with its ends spaced apart, a supporting member located above the drum, a horizontally arranged shaft supported in a stationary manner by the supporting member and extending over the drum, a lever having a short lower portion extending at a slight angle from the major portion and the upper part of said short portion having a bearing opening therein through which the shaft passes, means for pivotally connecting the lower end of said short portion to one end of the brake band, a link, adjustable as to its length having one end pivotally connected to the opposite end of the band, and its other end pivotally connected to the lever slightly above said short portion, and a spring coiled on the shaft and having one end connected with the shaft and its other end connected with the lever adjacent the point where the short portion joins the major part of the lever.

ULRICH WIPPERMANN.